United States Patent
Turvey

(10) Patent No.: US 9,866,668 B2
(45) Date of Patent: Jan. 9, 2018

(54) APPARATUS AND METHOD FOR PROVIDING REAL-TIME FEEDBACK FOR INFORMATION TRANSFER

(71) Applicant: Nokia Technologies Oy, Espoo (FI)

(72) Inventor: Simon Turvey, Sunnyvale, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/104,703

(22) PCT Filed: Dec. 17, 2013

(86) PCT No.: PCT/US2013/075694
§ 371 (c)(1),
(2) Date: Jun. 15, 2016

(87) PCT Pub. No.: WO2015/094181
PCT Pub. Date: Jun. 25, 2015

(65) Prior Publication Data
US 2017/0126877 A1    May 4, 2017

(51) Int. Cl.
*G06F 3/00*    (2006.01)
*H04M 1/725*    (2006.01)
(Continued)

(52) U.S. Cl.
CPC ........ *H04M 1/72519* (2013.01); *H04L 67/06* (2013.01); *H04W 4/008* (2013.01); *H04W 76/02* (2013.01)

(58) Field of Classification Search
CPC ... G06F 21/10; G06F 21/6218; G06F 21/6245
(Continued)

(56) References Cited

U.S. PATENT DOCUMENTS 8,185,601 B2    5/2012  Ruhala et al.
2005/0131923 A1    6/2005  Noguchi et al.
(Continued)

FOREIGN PATENT DOCUMENTS

EP    1 307 021 A2    5/2003
JP    2000-194666 A    7/2000
JP    2012-114848 A    6/2012

OTHER PUBLICATIONS

International Search Report and Written Opinion received for corresponding Patent Cooperation Treaty Application No. PCT/US2013/75694, dated May 22, 2014, 9 pages.
(Continued)

*Primary Examiner* — Lee Nguyen
(74) *Attorney, Agent, or Firm* — Ditthavong & Steiner, P.C.

(57) ABSTRACT

Devices, systems, and methods are described for allowing a user to transfer information at desired levels by providing the user with real-time feedback regarding the level of information that has been transferred. The devices, systems, and methods establish a communication link with a target device, cause information to be transferred to the target device via the communication link, and cause an indication of a level of the information transferred to be provided to a user during transfer of the information such that the user is provided with a real time indication of the level of information that has been transferred prior to transfer of a maximum level of information that is transferable.

20 Claims, 6 Drawing Sheets

(51) Int. Cl.
*H04W 4/00* (2009.01)
*H04W 76/02* (2009.01)
*H04L 29/08* (2006.01)
*G06F 17/27* (2006.01)

(58) Field of Classification Search
USPC .................................. 715/741, 743; 726/27
See application file for complete search history.

(56) References Cited

U.S. PATENT DOCUMENTS

| | | |
|---|---|---|
| 2005/0229036 A1 | 10/2005 | Milstein et al. |
| 2011/0296308 A1* | 12/2011 | Yi .......................... G06F 21/52 |
| | | 715/733 |
| 2012/0011408 A1* | 1/2012 | Swamy ............... G06F 11/0745 |
| | | 714/57 |
| 2012/0069199 A1 | 3/2012 | Chang et al. |

OTHER PUBLICATIONS

Office Action for corresponding European Patent Application No. 13899535.2-1953, dated Aug. 3, 2017, 7 pages.
Office Action for corresponding Japanese Patent Application No. 2016-540045, dated Jul. 6, 2017, 6 pages.

* cited by examiner

APPARATUS AND METHOD FOR PROVIDING REAL-TIME FEEDBACK FOR INFORMATION TRANSFER

RELATED APPLICATION

This application was originally filed as Patent Cooperation Treaty Application No. PCT/US2013/075694 filed Dec. 17, 2013.

TECHNOLOGICAL FIELD

Example embodiments of the present invention relate generally to the transfer of information between user devices.

BACKGROUND

The information age has made information available to users through various wired and wireless networks on many different types of devices, from laptop computers to cellular telephones. Along with the increased access to information, however, has come increased user demand for sharing content with other users through their user devices.

Modern mobile devices are capable of storing a large amount of information, and the types of information a user may store can vary. A user may wish to share some of the information with another user, but may not wish to share all of the information.

BRIEF SUMMARY OF EXAMPLE EMBODIMENTS

Accordingly, it may be desirable to provide improved mechanisms by which appropriate levels of information may be shared between devices, and wherein a user may receive a real-time indication, during the information transfer process, of the level of information that has been transferred. Embodiments of an apparatus, method, and computer program product are thus described that can provide the user with an indication when a pre-defined, discrete level of information has been transferred, such that the user can decide, in real-time, whether to continue to transfer the next level of information or stop the transfer operation.

In one embodiment, an apparatus is provided comprising at least one processor and at least one memory including computer program code. The at least one memory and the computer program code are configured to, with the processor, cause the apparatus to at least establish a communication link with a target device and cause information to be transferred to the target device via the communication link. The at least one memory and the computer program code are configured to, with the processor, cause the apparatus to cause an indication of a level of the information transferred to be provided to a user during transfer of the information in an instance in which a discrete, predefined level of information has been transferred, such that the user is provided with a real-time indication of the level of information that has been transferred prior to transfer of a maximum level of information that is transferable. The at least one memory and the computer program code may be configured to, with the processor, cause the apparatus to receive input from the user modulating the level of information transferred to the target device during transfer of the information and prior to transfer of the maximum level of information that is transferable.

In some cases, the communication link comprises near field communication, Bluetooth communication, or infrared communication. The indication may comprise haptic feedback, and/or the indication may comprise at least one of audio or visual feedback. Moreover, the indication may be a continuous indication that is generally coextensive with the transfer of information, wherein the indication reflects a real-time variation in the level of information that has been transferred as a function of time. The level of information may comprise an amount of information or a type of information.

In other embodiments, a method and a computer program product are described that establish a communication link with a target device; cause information to be transferred to the target device via the communication link; and cause an indication of a level of the information transferred to be provided to a user during transfer of the information in an instance in which a discrete, predefined level of information has been transferred, such that the user is provided with a-real time indication of the level of information that has been transferred prior to transfer of a maximum level of information that is transferable. In some cases, input may be received from the user modulating the level of information transferred to the target device during transfer of the information and prior to transfer of a maximum level of information that is transferable.

In some embodiments, the communication link may comprise near field communication, Bluetooth communication, or infrared communication. The indication may comprise haptic feedback and/or the indication may comprise at least one of audio or visual feedback. The indication may be a continuous indication that is generally coextensive with the transfer of information, wherein the indication reflects a real-time variation in the level of information that has been transferred as a function of time. Moreover, the level of information may comprise an amount of information or a type of information.

In still other embodiments, an apparatus is provided for providing an indication to a user of a level of the information transferred. The apparatus may include means for establishing a communication link with a target device; means for causing information to be transferred to the target device via the communication link; and means for causing an indication of a level of the information transferred to be provided to a user during transfer of the information in an instance in which a discrete, predefined level of information has been transferred, such that the user is provided with a real-time indication of the level of information that has been transferred prior to transfer of a maximum level of information that is transferable. In some cases, the apparatus may further comprise means for receiving input from the user modulating the level of information transferred to the target device during transfer of the information and prior to transfer of the maximum level of information that is transferable. The indication may be a continuous indication that is generally coextensive with the transfer of information, wherein the indication reflects a real-time variation in the level of information that has been transferred as a function of time.

BRIEF DESCRIPTION OF THE SEVERAL VIEWS OF THE DRAWINGS

Figure 1:
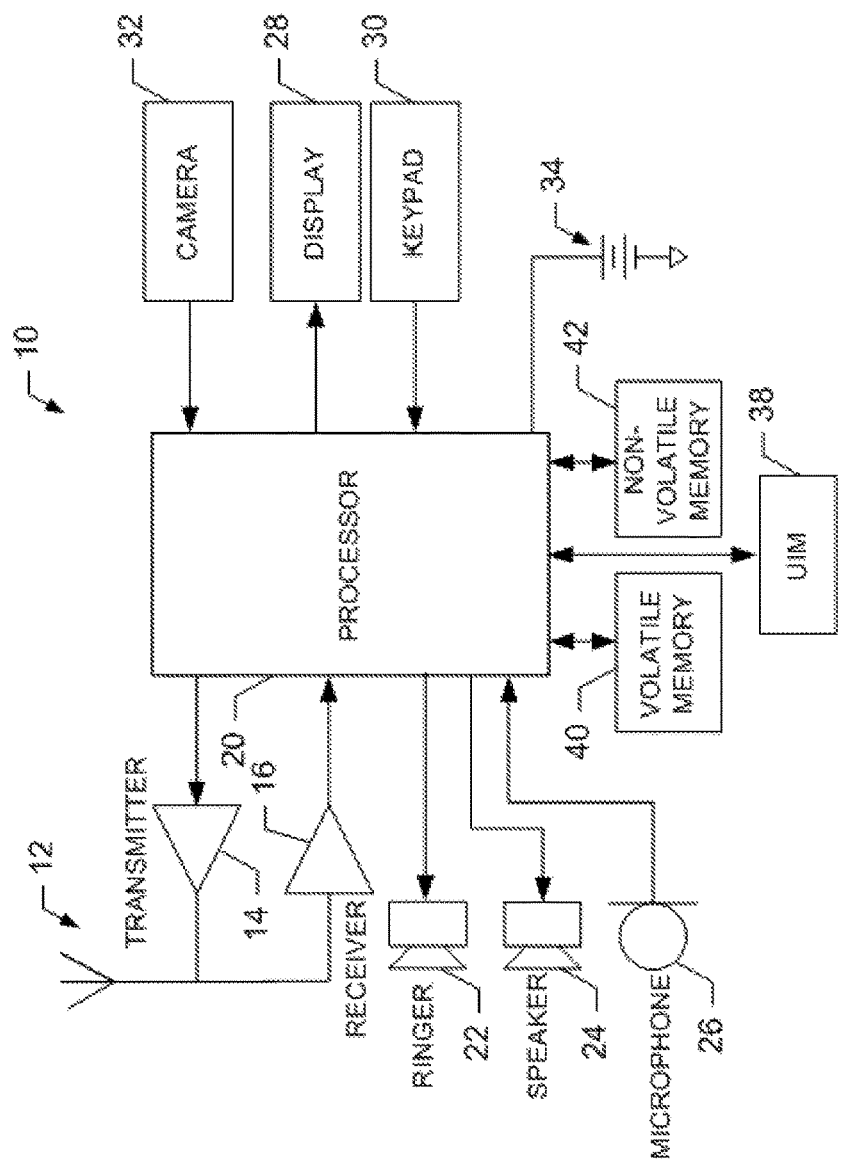
Figure 2:
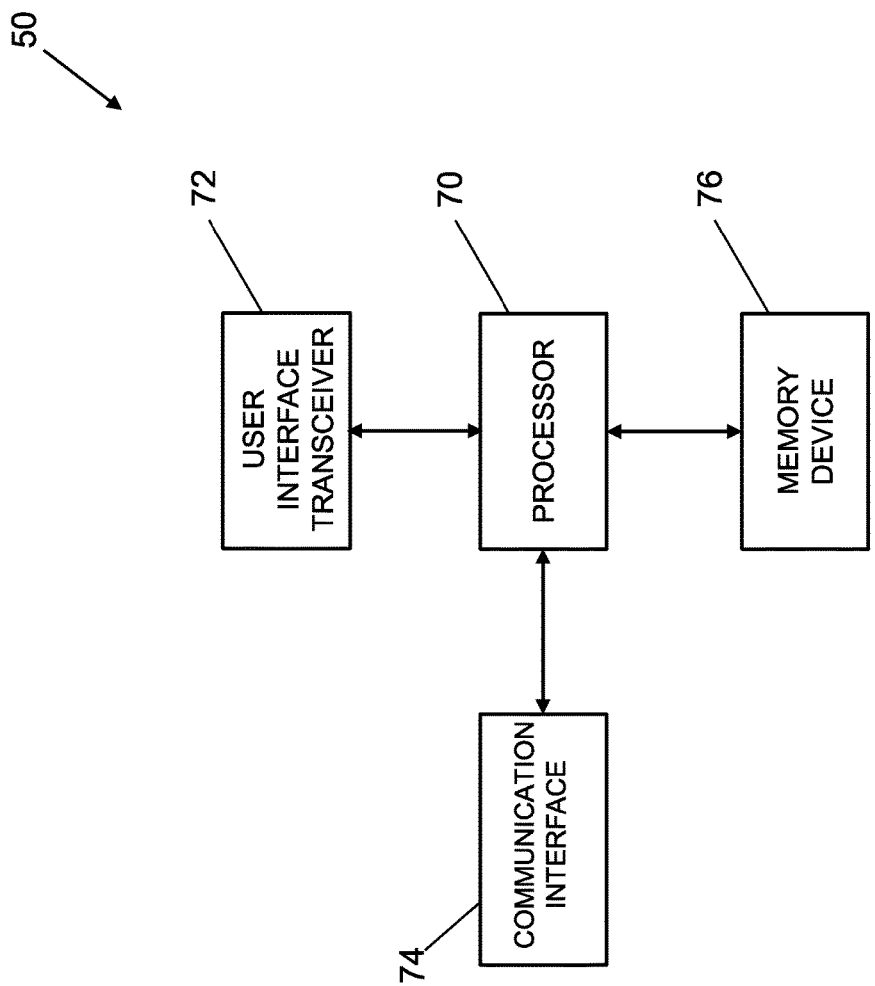
Figure 3:
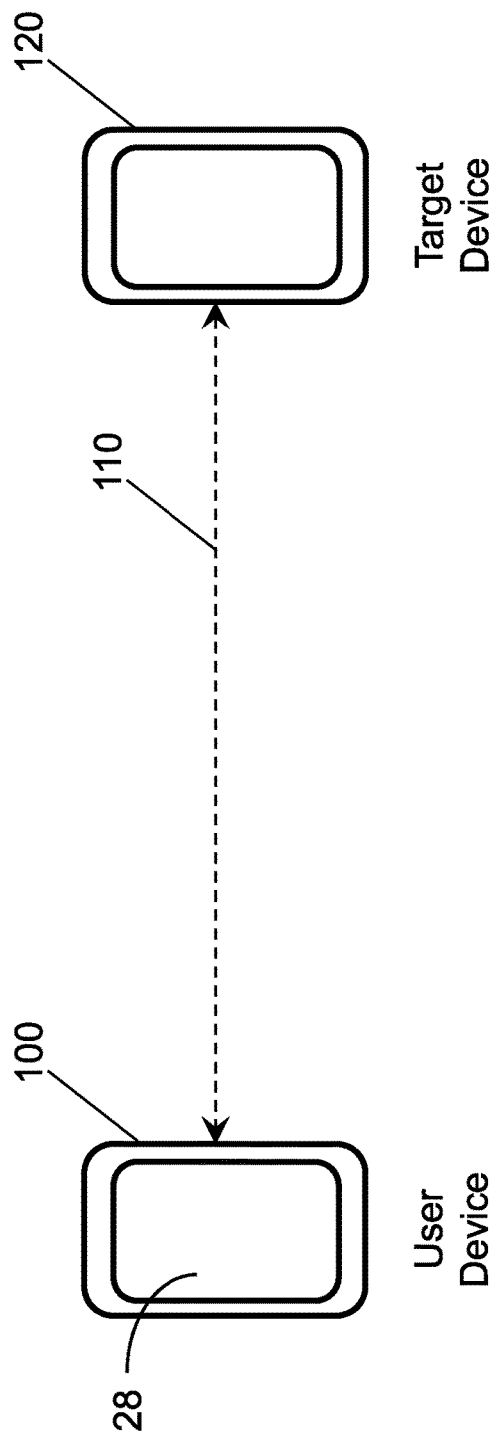
Figure 4A:
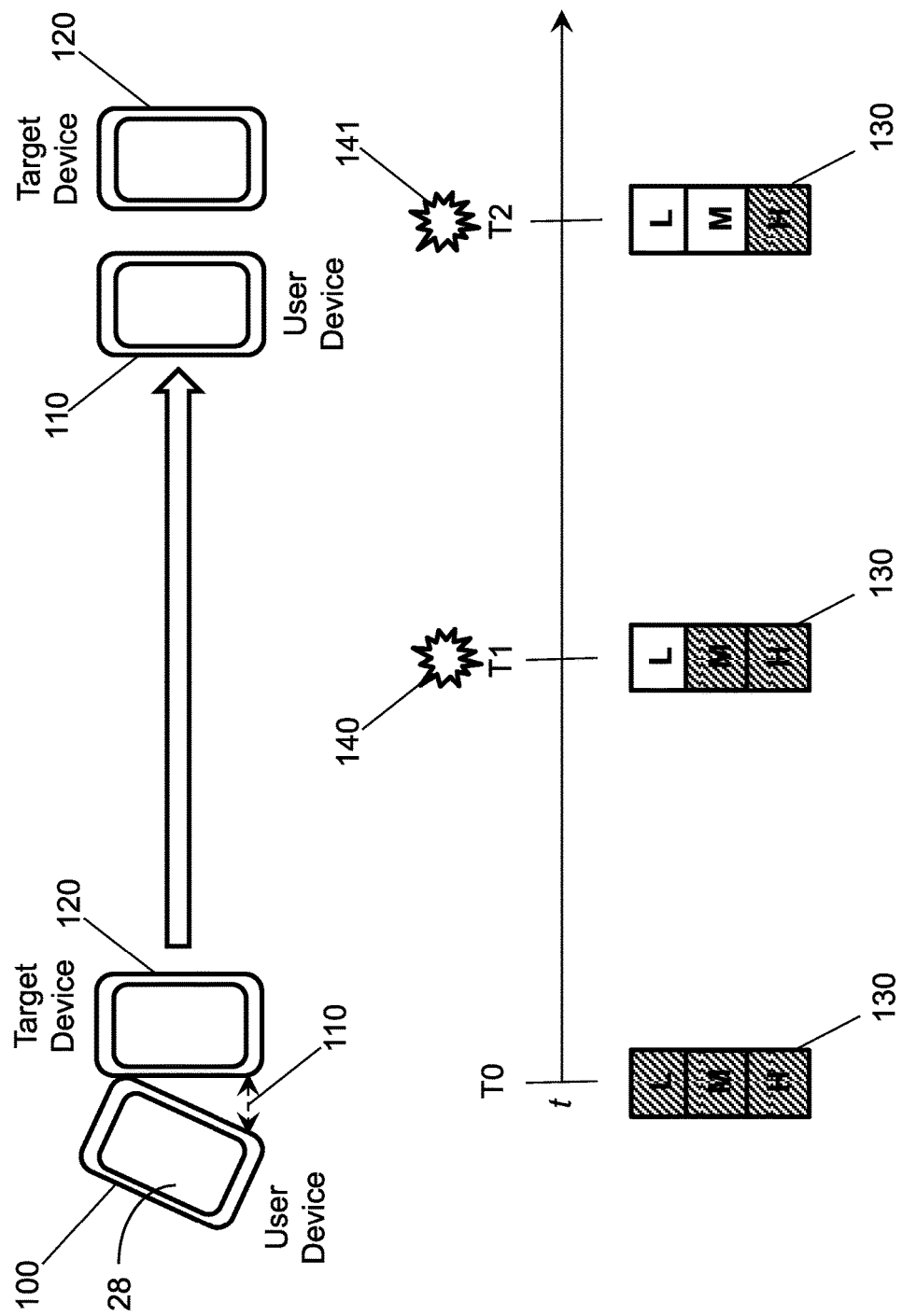
Figure 4B:
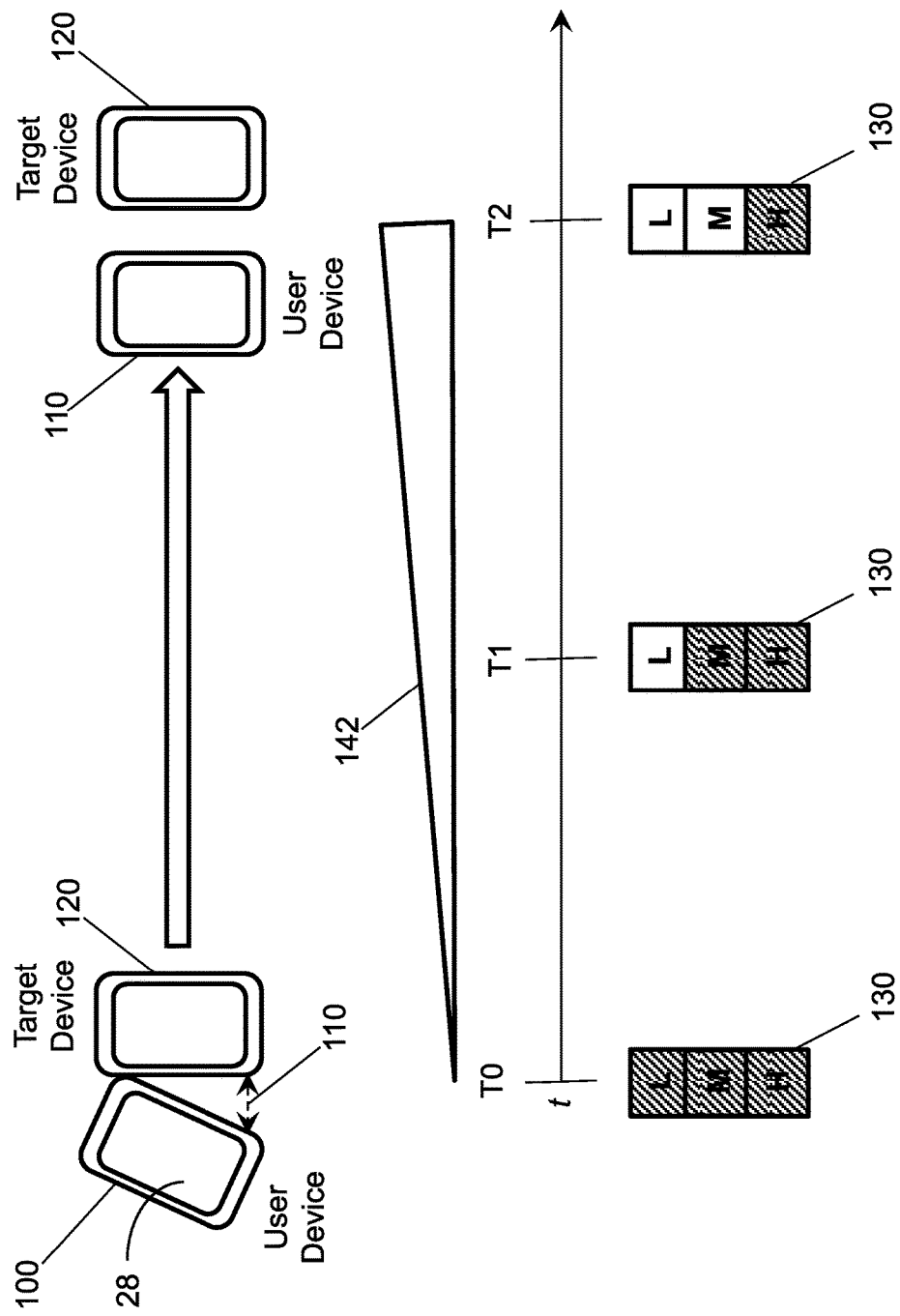
Figure 5:
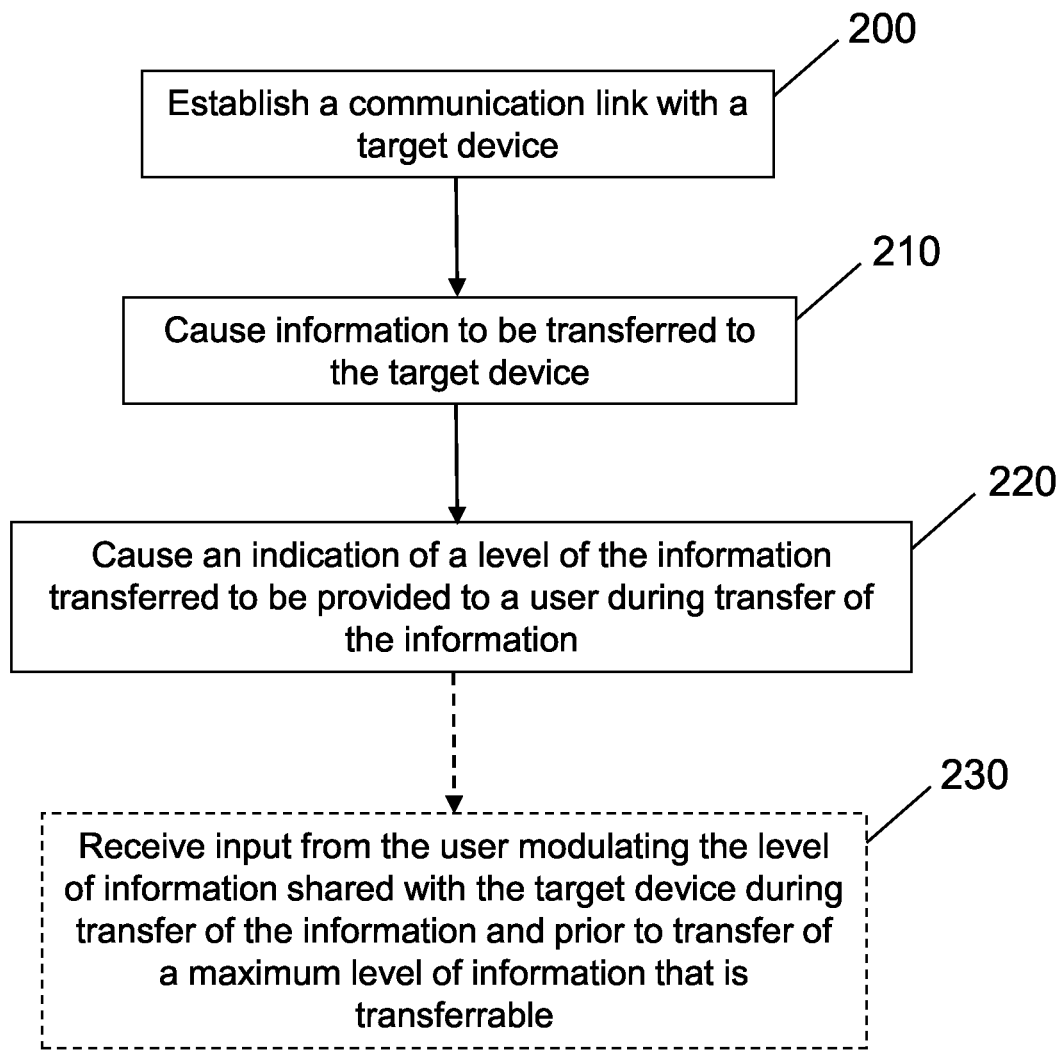

Having thus described example embodiments of the invention in general terms, reference will now be made to the accompanying drawings, which are not necessarily drawn to scale, and wherein:

FIG. 1 illustrates one example of a communication system according to an example embodiment of the present invention;

FIG. 2 illustrates a schematic block diagram of an apparatus for causing a real-time indication of a level of transferred information to be provided to a user according to an example embodiment of the present invention;

FIG. 3 illustrates a user device and a target device according to an example embodiment of the present invention;

FIGS. 4A and 4B illustrate timelines for an information transfer operation between a user device and a target device according to an example embodiment of the present invention; and FIG. 5 illustrates a flowchart of methods of causing a real-time indication of a level of transferred information to be provided to a user according to an example embodiment of the present invention.

DETAILED DESCRIPTION

Some example embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), can be differentiated from a "computer-readable transmission medium," which refers to an electromagnetic signal.

Users of mobile devices often have a need or desire to share information residing on their respective devices with each other. In this day and age, however, the amount and type of information that is stored on user devices can be large and varied. With respect to a user's contacts, for example, the user may maintain a listing of various types of contacts, from work colleagues to family members, close friends and acquaintances to service providers (e.g., plumbers and kids' schools). Depending on the person with whom the user wishes to share information, the user may desire to transfer only certain levels of information. For example, to an acquaintance having plumbing problems, the user may wish to transfer a select item of information (e.g., the contact information for his plumber). With a new member of his work group, the user may wish to share more than a select contact entry, but less than all of the information in his contacts, and may thus desire to transfer a limited amount of information (e.g., only the contact information for his work contacts). In some cases, a user may designate some items of information as private or personal, as compared to designating other information as public, and the user may only wish to share a certain type of information with another device (e.g., only public information).

The devices may be configured to perform information transfer operations in response to proximity-based or other types of user input that relies upon the co-location of the user's device and the target device (e.g., the device to which the user wishes to transfer information). For example, information may be shared between devices using a communication link, such as a proximity-based wireless communications link established, for example, via Bluetooth and Wireless LAN (WLAN), as well as Near Field Communication (NFC) protocols and infrared communication, to name a few. In this regard, in some embodiments described below, the transfer of information from the user's device to the target device may occur in real time, for example, while the user and the person to whose device the information is being transferred are co-located. According to one example scenario, the user may, in one embodiment, touch his own device to the target device, and the information may be transferred from the user's device to the target device while the two devices are in contact. As another example, information may be shared in response to one or both devices engaging in a certain (e.g., coordinated) motions or in response to a particular orientation or proximity of one or both devices with respect to the other.

Accordingly, embodiments of the present invention provide for devices, systems, and methods that allow a user to transfer information only at a desired level (e.g., only a desired amount or type of information, etc.) by providing real-time feedback regarding the level of information that has already been transferred at a particular point or points during the transfer. In this way, the user may be able to control the level of information being transferred, for example, by discontinuing the transfer of information once the desired level has been reached, in a more natural, more intuitive way.

Turning now to FIG. 1, which provides one example embodiment, a block diagram of a mobile terminal 10 that would benefit from embodiments of the present invention is illustrated. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a processor 20 or other processing device (e.g., processor 70 of FIG. 2), which controls the provision of signals to and the receipt of signals from the transmitter 14 and receiver 16, respectively. The signals may include signaling information in accordance with the air interface standard of the applicable cellular system, and also user speech, received data and/or user generated data. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the processor 20 may include circuitry desirable for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to convolutionally encode and interleave message and data prior to modulation and transmission. The processor 20 may additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch screen display (display 28 providing an example of such a touch screen display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch screen display, as described further below, may omit the keypad 30 and any or all of the speaker 24, ringer 22, and microphone 26 entirely. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

An example embodiment of the invention will now be described with reference to FIG. 2, which depicts certain elements of an apparatus 50 for causing a real-time indication of a level of transferred information to be provided to a user. The apparatus 50 of FIG. 2 may be employed, for example, with the mobile terminal 10 of FIG. 1. However, it should be noted that the apparatus 50 of FIG. 2 may also be employed in connection with a variety of other devices, both mobile and fixed, and therefore, embodiments of the present invention should not be limited to application on devices such as the mobile terminal 10 of FIG. 1. For example, the apparatus 50 may be employed on a personal computer, a tablet, a mobile telephone, or other user terminal. Moreover, in some cases, part or all of the apparatus 50 may be on a fixed device such as a server or other service platform and the content may be presented (e.g., via a server/client relationship) on a remote device such as a user terminal (e.g., the mobile terminal 10) based on processing that occurs at the fixed device.

It should also be noted that while FIG. 2 illustrates one example of a configuration of an apparatus 50 for causing a real-time indication of a level of transferred information to be provided to a user, numerous other configurations may also be used to implement embodiments of the present invention. As such, in some embodiments, although devices or elements are shown as being in communication with each other, hereinafter such devices or elements should be considered to be capable of being embodied within a same device or element and, thus, devices or elements shown in communication should be understood to alternatively be portions of the same device or element.

Referring now to FIG. 2, the apparatus 50 may include or otherwise be in communication with a processor 70, a user interface transceiver 72, a communication interface 74, and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, content, applications, instructions, or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard-coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. Additionally or alternatively, the communication interface 74 may include the circuitry for interacting with the antenna(s) to cause transmission of signals via the antenna(s) or to handle receipt of signals received via the antenna(s). In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface transceiver 72 may be in communication with the processor 70 to receive an indication of a user input and/or to cause provision of an audible, visual, mechanical or other output to the user. As such, the user interface transceiver 72 may include, for example, a keyboard, a mouse, a joystick, a display, a touch screen(s), touch areas, soft keys, a microphone, a speaker, a vibration pack, or other input/output mechanisms. Alternatively or additionally, the processor 70 may comprise user interface circuitry configured to control at least some functions of one or more user interface elements such as, for example, a speaker, ringer, microphone, vibration pack, display, and/or the like. The processor 70 and/or user interface circuitry comprising the processor 70 may be configured to control one or more functions of one or more user interface elements through computer program instructions (e.g., software and/or firmware) stored on a memory accessible to the processor 70 (e.g., memory device 76, and/or the like).

Turning now to FIG. 3, in general, an apparatus 50 (shown in FIG. 2) is provided that is embodied by a user device 100, such as the mobile terminal 10 of FIG. 1 (e.g., a cellular phone) that has or is otherwise associated with a display 28, such as a touch screen display. As described above, the apparatus may comprise at least one processor (e.g., processor 70 of FIG. 2) and at least one memory (e.g., memory device 76 of FIG. 2) including computer program code. The at least one memory and the computer program code may be configured to, with the processor, cause the apparatus to establish a communication link 110 with a target device 120 and cause information to be transferred to the target device via the communication link.

In an example embodiment, the user may establish a communication link 110 between his device 100 and the target device 120 by touching his device to the target device, as shown in FIGS. 4A and 4B. The touch may also serve to cause information to begin to be transferred to the target device 120 via the communication link 110. Although a touch between the two devices 100, 120 is shown in FIGS. 4A and 4B as being the trigger for establishing the communication link 110 and beginning the transfer process, any number of triggers may be used. For example, the communication link 110 may be established via a coordinated or particular motion of one or both of the devices 100, 120, due to proximity of the two devices to each other, or as a result of the user's interaction with his device 100, such as to select the target device 120 as a recipient of information using touch inputs provided via interaction with the device 100 (e.g., via interaction with a touch screen display of the device). Similarly, the transfer of information from the user device 100 to the target device 120 may be initiated automatically, such as due to the communication link 110 being established, as a result of the same trigger that established the communication link, or by virtue of an input provided by the user, such as a touch between devices 100, 120 or the user's interaction with the device 100, for example, to select an option presented on the display (e.g., "Begin transfer process") or the like.

Different levels of information may be transferred during the information transfer process. The level of information may, for example, be an amount of information (e.g., a number of files or a number of contact entries). Additionally or alternatively, the level of information may be a type of information that is authorized for transfer. The type of information may be, for example, a privacy setting (e.g., public versus private information), a file or application type (e.g., email, contacts, certain file type extensions, applications, etc.), and so on.

For example, the user of the user device 100 shown in FIGS. 3, 4A, and 4B may have both business information and personal information stored or otherwise accessible via his device. Such information may include, for example, contact information, emails, software applications, documents, etc. The user may, however, only wish to share his business information with a work colleague without necessarily sharing his personal information.

As noted above, it may be difficult for a user to modulate the level of information that is transferred to the target device 120. Under conventional systems and methods, a user may have to manually designate certain information, prior to commencement of a transfer operation, as information that can be shared. Moreover, such designations may need to be changed or modified for subsequent transfer processes, depending on the intended recipient and what kind of information the user wishes to share with particular recipients.

Accordingly, embodiments of the at least one memory and the computer program code described above may further be configured to, with the processor, cause the apparatus to cause an indication of a level of the information transferred to be provided to the user of the device 100 during transfer of the information, such that the user is provided with a real-time indication of the level of information that has been transferred prior to transfer of a maximum level of information that is transferable. The maximum level of information that is transferable may, in some cases, be all of the information stored in a particular memory or location within a memory of or accessible to the user device 100. Alternatively, the maximum level of information may be all of the information that was previously designated as transferable by the user, such as via a privacy setting or other designation or setting of the device 100.

The maximum level of information that is transferable is represented in FIGS. 4A and 4B by the bar 130. In the depicted embodiment, the bar 130 illustrates that, in this particular example, three levels of information are transferable. In this regard, each "level" of information may be a predefined, discrete amount of information. The three levels of information may be, for example, Low, Medium, and High. In some embodiments, the levels of information may represent levels of privacy designated by the user and/or by the system. In this example, "Low" may describe information having a low level of privacy, such as a discrete amount of information that is designated as public information. Continuing this example, "Medium" may describe information having a medium level of privacy (e.g., semi-public or semi-private information), and "High" may describe information having a high level of privacy (e.g., private information). Although in the example above the discrete "levels" of information represent levels of privacy, the predefined, discrete groupings into which the information is classified may relate to other characteristics of the information in addition to or instead of privacy, such as file size, file resolution, level of detail, etc.

According to some embodiments, upon initiation of the transfer operation, the information may be transferred according to a certain hierarchy or order. For example, the Low level of information (e.g., public information) may be transferred to the target device 120 first, followed by the Medium level of information, followed by the High level of information.

Each level of information is represented in the bar 130 of FIGS. 4A and 4B by a block L (Low), M (Medium), and H (High). Cross-hatched blocks represent information that is available for transfer, but not yet transferred to the target device 120, whereas white blocks represent information that has been transferred to the target device 120. The transfer process is associated with a timeline t in the depicted examples, which begins at time T0 corresponding to the point in time at which the user device 100 and the target device 120 touch and the information begins to be transferred to the target device via an established communication link 110 and extends to a time (not shown) corresponding to the point in time at which all transferable information has been transferred.

In some embodiments, the at least one memory and the computer program code may be configured to, with the processor, cause the apparatus to receive input from the user modulating the level of information that is transferred to the target device during transfer of the information and prior to transfer of a maximum level of information that is transferable. With reference to FIG. 4A, for example, as information is being transferred (e.g., during the transfer process), an indication of the level of information that has been transferred may be provided to the user to allow the user to determine, in real time, whether he should continue the transfer process or stop the transfer of information.

In some embodiments, for example, an indication 140 may be provided after the first level of information (Low) has been transferred, at time T1. In the depicted example, the user may desire to transfer more than the Low level of information to the target device 120 and so may continue to maintain contact (in this example) between the user's device 100 and the target device 120 to keep the transfer operation in progress. Continuing the example of FIG. 4A, another indication 141 may be provided to the user at time T2, after the second level of information (Medium) has been transferred. At this point, in the depicted example, the user may determine that a sufficient level of information has been transferred and may discontinue the transfer process by moving the user device 100 away from (e.g., breaking contact with) the target device 120 or otherwise stopping the transfer of information, as shown.

The indication 140, 141 may, in some cases, comprise haptic feedback, such as a vibration or other tactile output that the user holding the device 100 can sense. In other cases, the indication 140, 141 may comprise audio feedback, such as a beep, a ring, a buzz, or some other sound that alerts the user that a certain level of information has been transferred to the target device 120. For example, once a Low level of information has been shared, a single buzz or tone may be generated as the indication 140; once a Medium level of information has been shared, two buzzes or tones may be provided in rapid succession as the indication 141; and so on.

In still other cases, the indication 140, 141 may comprise visual feedback. For example, an icon or series of icons may be provided on the display of the device 100 to indicate to the user that a particular level of information has been transferred. As another example, different colors or levels of brightness may be provided on the display of the device 100 as an indication 140, 141 of the level of information that has been transferred. Furthermore, in some embodiments, the indication 140, 141 may be provided on the device 100 at a location other than the display, such as on the case of the device itself (e.g., via a light), or the entire case or a portion thereof may have a dynamically changing color that represents the level of information transferred. Moreover a combination of haptic, audio, and visual feedback may be provided as the indication 140, 141, either substantially simultaneously or sequentially.

As noted above, the discrete levels of information may be predefined (e.g., by the user or the system). In some embodiments, however, the definition of the levels (e.g., which information should be classified under which level) may be determined based on the user's behavior during a transfer operation. For example, the first time a user transfers a certain type of information (e.g., contact information), the apparatus may be configured to "learn" which information the user considers part of a "Low" level of information (e.g., public information), as opposed to "Medium" or "High." In this regard, the user may be presented with visual feedback on the display describing the information that has already been transferred, as well as the information currently being transferred and the information that is to be transferred next. Using this guide, the user may cease the transfer operation at any time the user feels that enough information has been transferred. The information transferred for multiple transfer operations may be stored, correlated, and otherwise analyzed to determine which information the user considers to be "Low" level information (e.g., information that can be transferred to a majority of recipients), "Medium" level information (e.g., information that can be transferred to some, but not all recipients), and "High" level information (e.g., information that can be transferred to only a few select recipients). Based on this historical data, the information can be associated with each of these designations, and the designations may be used in future transactions as the discrete predefined levels for information transfer.

In some embodiments, the indication of the level of information transferred may be a continuous indication that is generally coextensive with the transfer of information, such that the indication reflects a real-time variation in the level of information that has been transferred as a function of time. The underlying levels of information transferred during the transfer operation, however, may still be discrete, predefined levels of information, despite being represented by a continuous indication. With reference to FIG. 4B, for example, the continuous indication 142 may be provided beginning at time T0 (e.g., at generally the same time that the information transfer operation between the devices 100, 120 is started) and may continue to be provided through time T1 and up to time T2, at which point the information transfer is ceased by the user.

As represented in FIG. 4B by the gradually increasing size (e.g., height) of the indication 142, the indication, although continuous from T0 to T2, may be gradually changed or modified to represent the underlying discrete levels of information that have been transferred to the target device 120 as the transfer operation progresses along the timeline t. As an example, the continuous indication may be a tone that is sounded at time T0 at a first loudness and/or pitch. The loudness and/or pitch may be gradually changed as the level of information transferred approaches the level L (time T1), the level M (time T2), and so on. Thus, for example, the user may hear the tone get louder and may break the contact between the devices 100, 120 to stop the transfer of information once the tone reaches a particular loudness indicative of the discrete level of information the user desires to transfer. Alternatively or additionally, the continuous indication may be a light that is provided at time T0 and continues shining as the transfer operation progresses along the timeline t, but at a gradually increasing degree of brightness or gradually changing color that provides the user with a visual indication of the changing level of information that has been transferred.

FIG. 5 illustrates a flowchart of systems, methods, and computer program products according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device of an apparatus employing an example embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus implements the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions, and program instruction means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, one example embodiment of a method for causing a real-time indication of a level of transferred information to be provided to a user is shown in FIG. 5. FIG. 5 depicts an example embodiment of the method that establishes a communication link with a target device at block 200, causes information to be transferred to the target device via the communication link at block 210, and causes an indication of a level of the information transferred to be provided to a user during transfer of the information in an instance in which a discrete, predefined level of information has been transferred, at block 220, where the user is provided with a real-time indication of the level of information that has been transferred prior to transfer of a maximum level of information that is transferable. In some cases, input may be received from the user at block 230 modulating the level of information transferred to the target device during transfer of the information and prior to transfer of the maximum level of information that is transferable. The level of information may comprise, for example, an amount of information or a type of information, as described above.

The communication link, in some cases, may comprise near field communication, Bluetooth communication, or infrared communication. Additionally or alternatively, the indication may comprise haptic feedback, audio feedback, and/or visual feedback, as described above. The indication may, in some cases, be a continuous indication that is generally coextensive with the transfer of information, where the indication reflects a real-time variation in the level of information that has been transferred as a function of time.

In some embodiments, certain ones of the operations above may be modified or further amplified as described below. Furthermore, in some embodiments, additional optional operations may be included, some examples of which are shown in dashed lines in FIG. 5. Modifications, additions, or amplifications to the operations above may be performed in any order and in any combination.

In an example embodiment, an apparatus for performing the methods of FIG. 5 above may comprise a processor (e.g., the processor 70 of FIG. 2) configured to perform some or each of the operations (200-230) described above. The processor may, for example, be configured to perform the operations (200-230) by performing hardware implemented logical functions, executing stored instructions, or executing algorithms for performing each of the operations. Alternatively, the apparatus may comprise means for performing each of the operations described above. In this regard, according to an example embodiment, examples of means for performing at least portions of operations 200 and 210 may comprise, for example, the processor 70, the communication interface 74, and/or a device or circuit for executing instructions or executing an algorithm for processing information as described above. Examples of means for performing operation 220 may comprise, for example, the user interface transceiver 72, the processor 70, the memory device 76, and/or a device or circuit for executing instructions or executing an algorithm for processing information as described above. Examples of means for performing operation 230 may comprise, for example, the user interface transceiver 72, the processor 70, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus embedded in a user device to at least:
   monitor user information sharing behaviors with a plurality of receiving user devices with respect to a type of information residing on the user device;
   define a plurality of information sharing levels for the type of information based, at least in part, on a respective number of receiving user devices that shared at least a respective portion of the type of information, and one or more respective types of contacts associated with a user of the user device;
   establish a communication link with a target device; and
   transfer, level by level starting from a lowest information sharing level, a respective portion of the type of information of a respective information sharing level to the target device via the communication link while indicating in real time the respective information sharing level prior to transfer of a maximum information sharing level.

2. The apparatus of claim 1, wherein the apparatus is further caused to: receive a user input at the user device modulating the maximum information sharing level to be transferred to the target device,
   wherein each respective type of contacts includes a plurality of contacts of the user.

3. The apparatus of claim 1, wherein the communication link comprises near field communication, Bluetooth communication, or infrared communication.

4. The apparatus of claim 1, wherein the indication comprises haptic feedback.

5. The apparatus of claim 1, wherein the indication comprises at least one of audio or visual feedback.

6. The apparatus of claim 1, wherein the indication is a continuous indication that is generally coextensive with the transfer of information, wherein the indication reflects a real-time variation in the level of information that has been transferred as a function of time.

7. The apparatus of claim 1, wherein the level of information comprises an amount of information or a type of information.

8. A method comprising:
   monitoring, by a user device, user information sharing behaviors with a plurality of receiving user devices with respect to a type of information residing on the user device;
   defining, by the user device, a plurality of information sharing levels for the type of information based, at least in part, on a respective number of receiving user devices that shared at least a respective portion of the type of information, and one or more respective types of contacts associated with a user of the user device;

establishing, by the user device, a communication link with a target device; and transferring, by the user device level by level starting from a lowest information sharing level, a respective portion of the type of information of a respective information sharing level to the target device via the communication link while indicating in real time the respective information sharing level prior to transfer of a maximum information sharing level.

9. The method of claim 8, further comprising: receiving a user input at the user device modulating the maximum information sharing level to be transferred to the target device, wherein each respective type of contacts includes a plurality of contacts of the user.

10. The method of claim 8, wherein the short range wireless communication link and the transfer of the type of information are triggered by a coordinated or relative motion of one or both of the user and target devices cause the user and target devices to locate in a proximity of each other, and the transfer stops once the user and target devices move out of the proximity of each other, and wherein the communication link comprises near field communication, Bluetooth communication, or infrared communication.

11. The method of claim 8, wherein the indication comprises haptic feedback, and wherein the type of information specifies an application type, and the application type is an email application, a contacts application, or a file extension type.

12. The method of claim 8, wherein the indication comprises at least one of audio or visual feedback, and wherein the type of information is contacts information associated with a user of the user device, and the one or more types of contacts include work colleagues, family members, close friends, acquaintances, or a combination thereof.

13. The method of claim 8, wherein the indication is a continuous indication that is generally coextensive with the transfer of information, wherein the indication reflects a real-time variation in the level of information that has been transferred as a function of time.

14. The method of claim 8, wherein the information levels include a low information sharing level for information to be transferred to a majority of the receiving user devices, a medium information sharing level for information to transferred to some but not all of the receiving user devices, and a high information sharing level for information to be transferred to only a selected few of the receiving user devices, wherein a number of the selected few is smaller than a number of the some of the receiving user devices.

15. A non-transitory computer-readable storage medium carrying one or more sequences of one or more instructions which, when executed by one or more processors, cause an apparatus embedded in a user device to at least perform the following steps:

monitoring user information sharing behaviors with a plurality of receiving user devices with respect to a type of information residing on the user device;

defining a plurality of information sharing levels for the type of information based, at least in part, on a respective number of receiving user devices that shared at least a respective portion of the type of information, and one or more respective types of contacts associated with a user of the user device;

establishing a communication link with a target device; and transferring, level by level starting from a lowest information sharing level, a respective portion of the type of information of a respective information sharing level to the target device via the communication link while indicating in real time the respective information sharing level prior to transfer of a maximum information sharing level.

16. The non-transitory computer-readable storage medium of claim 15, wherein the apparatus is caused to further perform:

receiving a user input at the user device modulating the maximum information sharing level to be transferred to the target device, wherein each respective type of contacts includes a plurality of contacts of the user.

17. The non-transitory computer-readable storage medium of claim 15, wherein the communication link comprises near field communication, Bluetooth communication, or infrared communication.

18. The non-transitory computer-readable storage medium of claim 15, wherein the indication comprises haptic feedback.

19. The non-transitory computer-readable storage medium of claim 15, wherein the indication comprises at least one of audio or visual feedback.

20. The non-transitory computer-readable storage medium of claim 15, wherein the indication is a continuous indication that is generally coextensive with the transfer of information, wherein the indication reflects a real-time variation in the level of information that has been transferred as a function of time.

* * * * *